US010779612B2

(12) United States Patent
Hansen et al.

(10) Patent No.: US 10,779,612 B2
(45) Date of Patent: *Sep. 22, 2020

(54) ROCKER SHOES, ROCKER SHOE DEVELOPMENT KIT AND METHOD

(71) Applicant: The United States Government as represented by the Department of Veterans Affairs, Washington, DC (US)

(72) Inventors: Andrew H. Hansen, Minneapolis, MN (US); Sara R. Koehler, Minneapolis, MN (US); Charles J. Schultz, Minneapolis, MN (US); Eric A. Nickel, Minneapolis, MN (US)

(73) Assignee: United States Government as represented by the Department of Veterans Affairs, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,593

(22) Filed: May 14, 2019

(65) Prior Publication Data
US 2019/0261734 A1    Aug. 29, 2019

Related U.S. Application Data

(63) Continuation of application No. 15/569,378, filed as application No. PCT/US2016/029597 on Apr. 27, 2016, now Pat. No. 10,292,452.
(Continued)

(51) Int. Cl.
*A43B 13/14*    (2006.01)
*A43B 3/24*    (2006.01)
(Continued)

(52) U.S. Cl.
CPC .......... *A43B 13/145* (2013.01); *A43B 3/0078* (2013.01); *A43B 3/0094* (2013.01);
(Continued)

(58) Field of Classification Search
CPC .. A43B 3/24; A43B 3/246; A43B 7/38; A43B 13/12; A43B 13/127; A43B 13/143; A43B 13/145; A43B 13/146
(Continued)

(56) References Cited

U.S. PATENT DOCUMENTS

| | | |
|---|---|---|
| 244,083 A | 7/1881 | Smallwood |
| 434,678 A | 8/1890 | Quigg |

(Continued)

FOREIGN PATENT DOCUMENTS

EP    1785048 A1    5/2007

OTHER PUBLICATIONS

Dunn, E. et al., Prevalence of foot and ankle conditions in a multiethnic community sample of older adults. Am J Epidemiol. 2004; 159(5):491-8.
(Continued)

*Primary Examiner* — Marie D Bays
(74) *Attorney, Agent, or Firm* — Ballard Spahr LLP

(57) ABSTRACT

A rocker shoe has a lower rocker surface extending across the plantar surface of the shoe sole from the heel and terminating short of the toe. A rocker shoe construction kit has a rigid or substantially rigid rocker piece having an upper surface for securing over a major portion of a lower plantar surface of the sole of a shoe upper and a lower surface of predetermined rocker shape, a cushioning layer for securing over the lower surface of the rocker piece, and a layer of tread material configured for securing over the lower surface of the cushioning layer and any exposed portion of the plantar surface of a shoe.

12 Claims, 11 Drawing Sheets

Related U.S. Application Data

(60) Provisional application No. 62/153,365, filed on Apr. 27, 2015.

(51) Int. Cl.
*A43B 13/18* (2006.01)
*A43B 3/00* (2006.01)
*A43B 13/12* (2006.01)
*A43B 7/32* (2006.01)
*A43B 13/16* (2006.01)
*A43B 13/32* (2006.01)
*B32B 7/12* (2006.01)

(52) U.S. Cl.
CPC .............. *A43B 3/246* (2013.01); *A43B 7/32* (2013.01); *A43B 13/12* (2013.01); *A43B 13/143* (2013.01); *A43B 13/16* (2013.01); *A43B 13/188* (2013.01); *A43B 13/189* (2013.01); *A43B 13/32* (2013.01); *B32B 7/12* (2013.01); *B32B 2437/02* (2013.01)

(58) Field of Classification Search
USPC ................................ 36/100, 101, 25 R, 30 R
See application file for complete search history.

(56) References Cited

U.S. PATENT DOCUMENTS

| | | |
|---|---|---|
| 693,673 A | 2/1902 | Summers |
| 1,087,423 A | 2/1914 | Ballard |
| 1,463,753 A | 7/1923 | Reed |
| 1,467,712 A | 9/1923 | De Sanctis |
| 1,977,157 A | 10/1934 | Strobel |
| 2,046,353 A | 7/1936 | Whitmore |
| 2,048,837 A | 7/1936 | Byers |
| 3,203,050 A | 8/1965 | Hoffman |
| 4,348,821 A | 9/1982 | Daswick |
| 4,757,620 A | 7/1988 | Tiitola |
| 4,771,768 A | 9/1988 | Crispin |
| 4,794,707 A | 1/1989 | Franklin et al. |
| 5,592,757 A | 1/1997 | Jackinsky |
| 5,826,351 A | 10/1998 | Tsuji |
| 6,341,432 B1 | 1/2002 | Muller |
| 6,782,639 B1 | 8/2004 | Muller |
| 7,111,416 B2 | 9/2006 | Gallegos |
| 7,779,557 B2 | 8/2010 | Teteriatnikov et al. |
| 7,877,897 B2 | 2/2011 | Teteriatnikov et al. |
| 8,474,154 B2 | 7/2013 | Werremeyer et al. |
| 10,292,452 B2 * | 5/2019 | Hansen .................. A43B 3/246 |
| 2008/0016724 A1 | 1/2008 | Hlavac |
| 2009/0183393 A1 | 7/2009 | Lee |
| 2010/0146819 A1 | 6/2010 | Teteriatnikov et al. |
| 2010/0263228 A1 | 10/2010 | Kang |
| 2010/0263233 A1 | 10/2010 | Hansen et al. |
| 2010/0275471 A1 | 11/2010 | Teteriatnikov et al. |
| 2010/0299969 A1 | 12/2010 | Paez |
| 2011/0185593 A1 | 8/2011 | Ramos |
| 2013/0081305 A1 | 4/2013 | Byrne |
| 2014/0082861 A1 | 3/2014 | Dieter et al. |
| 2018/0295936 A1 | 10/2018 | Hansen et al. |

OTHER PUBLICATIONS

Helmick, C.G. et al., Estimates of the prevalence of arthritis and other rheumatic conditions in the United States: Part I. Arthritis Rheum. 2008; 58:15-25.

Hootman, J.M. and Helmick, C.G., Projections of US prevalence of arthritis and associated activity limitations. Arthritis Rheum. 2006; 54:226-9.

Hutchins, S. et al., The Biomechanics and clinical efficacy of footwear adapted with rocker profiles—Evidence in the literature. Foot. 2009; 19:165-70.

Lawrence, R.C. et al., Estimates of the prevalence of arthritis and other rheumatic conditions in the United States: Part II. Arthritis Rheum. 2008; 58:2635.

Rao, S. et al., Nonmedicinal therapy in the management of ankle arthritis. Curr Opin Rheumatol. 2010; 22:223-8.

Wang, C.C. and Hansen, A.H., Response of able-bodied persons to changes in shoe rocker radius during walking: changes in ankle kinematics to maintain a consistent roll-over shape. J Biomech. 2010; 43(12):2288-93.

Extended European Search Report dated Dec. 3, 2018 by the European Patent Office for Patent Application No. 16787085.6, which was filed on Apr. 27, 2016 and published as EP 3288408 on Mar. 7, 2018 (Inventor—Hansen et al.; Applicant—U.S. Government as Represented by the Department of Veterans Affairs) (9 pages).

International Search Report and Written Opinion dated Jul. 26, 2016 by the International Searching Authority for Patent Application No. PCT/US2016/029597, which was filed on Apr. 27, 2016 and published as WO 2016/176351 on Nov. 3, 2016 (Inventor—Hansen et al.; Applicant—U.S. Government as Represented by the Department of Veterans Affairs) (11 pages).

\* cited by examiner

ROCKER SHOES, ROCKER SHOE DEVELOPMENT KIT AND METHOD

CROSS REFERENCE TO RELATED APPLICATIONS

The present application is a continuation of and claims priority to U.S. non-provisional application Ser. No. 15/569,378, which was filed on Oct. 25, 2017, which is a U.S. national stage entry of PCT/US2016/029597, which was filed on Apr. 27, 2016, which is based on and claims priority to U.S. Provisional Application No. 62/153,365, filed on Apr. 27, 2015, all of which are hereby incorporated by reference in their entireties.

BACKGROUND

Related Field

The subject matter discussed herein relates generally to rocker shoes for treatment of foot and ankle problems, and is particularly concerned with a rocker shoe development kit and method for construction of rocker shoes for medical applications.

Related Background

Rocker modifications to shoes are commonly prescribed for treatment of numerous foot and ankle problems. Currently, the prescriptions are based primarily on theory and clinical experience, with limited science and validation (see "The Biomechanics and clinical efficacy of footwear adapted with rocker profiles—Evidence in the literature" by Hutchins, S. et al., The Foot, 19:165-170, 2009). Current rocker shoe design is a clinical art, with minimal guidelines for clinicians to follow for specific shoe designs. Rocker shoes are prescribed for a variety of medical reasons, including redistribution of plantar pressures away from bony prominences of the foot (e.g. for persons with sensation loss and risk of skin breakdown), and reduction of foot and ankle movements (e.g. for persons with pain at the tibiotalar or metatarsophalangeal joints).

A recent study suggests that humans adapt their ankle motion when wearing shoes with different rocker profiles to achieve a similar ankle-foot-shoe roll-over shape (see "Response of able-bodied persons to changes in shoe rocker radius during walking: Changes in ankle kinematics to maintain a consistent roll-over shape" by Wang C C, Hansen A H, Journal of Biomechanics, 43(12), 2288-93, 2010). US Pat. App. Pub. No. 2010/0263233 of Hansen et al. describes a system for determining a rocker sole profile for a prescribed ankle motion. One problem with current custom rocker shoe construction is that it is difficult and time consuming to produce rocker shoes for specific conditions in a systematic and repeatable fashion.

SUMMARY

According to one aspect, a rocker shoe construction or development kit is provided, which comprises a rocker piece or member of rigid or semi-rigid material having an upper surface and a lower surface of predetermined rocker shape, an intermediate layer for extending over the lower surface of the rocker piece, and a layer of tread material configured to cover the lower surface of the cushioning layer and any exposed portion of the plantar surface of a shoe to which the kit is secured and to conform to the rocker shape of the lower surface of the rocker piece. In one embodiment, the kit includes two sets each comprising a rocker piece, an intermediate layer, and a tread layer, configured for attachment to a right and left shoe, respectively. In one embodiment, the upper surface of the rocker piece is flat.

In one aspect, the development kit also comprises a pair of shoe uppers each having a sole with a lower or plantar surface which has a flat surface portion extending along at least part of the length of the sole from the heel towards the toe of the shoe upper for securing to the upper surface of the rocker piece. Alternatively, sole portions of an existing shoe may be cut to form the flat surface portion for attachment to the rocker member. In one aspect the rocker member may be oversized in the transverse plane such that after attachment to the shoe, the excess transverse rocker member material may be ground down to match the transverse profile of the shoe. In one aspect, the development kit also includes a dual last jig for holding a pair of shoes while the soles are cut to form the flat surface portions.

In one aspect, the sole of the existing shoe uppers and the rocker piece or member are provided with indicators for lining up the rocker piece with the ankle region of the shoe, i.e. the region where the ankle joint is expected to be located for persons with normal anatomy.

According to another aspect, a pair of rocker shoes are provided which are designed so that little or no motion is produced at the ankle during the single-limb support phase of walking, i.e. the period of highest compressive load. Each rocker shoe has a heel, a toe, and a sole with a lower rocker surface extending from the heel towards the toe. The rocker surface may extend over the entire plantar surface of the shoe or may terminate at a predetermined location short of the toe of the shoe. In one embodiment, the rocker surface terminates at a location corresponding to the first metatarsal phalangeal joint, which is generally located at around 75 to 80% of the length of the sole from the heel. In one aspect, the sole is formed from multiple layers attached to the existing shoe sole, comprising a rocker piece of rigid or semi-rigid material secured to the lower surface of the existing shoe sole and extending from the heel towards the toe of the shoe, a cushioning or intermediate layer secured to the lower surface of the rocker piece and following the shape of the rocker surface, and a tread layer secured to the lower surface of the cushioning layer and conforming to the shape of the cushioning layer. In one embodiment, the rocker surface is curved and has a predetermined rocker radius dependent on a wearer's height. The rocker piece may cover the entire plantar surface of the shoe or may cover only a portion of the plantar surface to produce a lower profile or lower height design.

In one embodiment, one or more inserts of different material from the rocker piece may be mounted in one or more cut-outs in the lower surface of the rocker piece between the rocker piece and cushioning layer. The inserts may be of highly damped material or comprise enclosures filled with a shear-thickening fluid or shear-thinning fluid. In the highly damped materials or shear-thickening case, the insert is designed to deform slowly into a flattened geometry during static loads associated with standing. In the shear-thinning case, inserts containing shear-thinning fluids may comprise the intermediate layer, and the shear-thinning fluid is designed to be stable under static loads and more fluid during dynamic loading.

According to yet another aspect of an example rocker shoe, the rocker shoe, comprises a shoe upper, and a rocker portion. The shoe upper has a heel, a toe, and a sole. The rocker portion has a lower rocker surface extending over at least a majority of the sole. The rocker portion comprises a rocker piece of rigid or semi-rigid material having an upper surface secured to the lower plantar surface of the shoe and a lower surface, an intermediate layer secured over the lower surface of the rocker piece, and a layer of tread material secured over the lower surface of the intermediate layer and over any exposed portion of the plantar surface of the shoe.

As an example, the rocker shoe further comprises one or more inserts of compressible material mounted in one or more cut-outs in the lower surface of the rocker piece, the intermediate layer extending over the lower surface of the rocker portion and inserts.

In an example, the rocker piece has a curved lower surface and the intermediate and tread layers are of softer material and conform to the curved lower surface of the rocker piece. In a particular example, the curvature of the lower rocker surface has a rocker radius in the range from 10%-25% of a wearer's height. In a particular example, the lower surface of the rocker piece has an arcuate indent and an insert of shear-thickening material mounted in the indent, the insert has a curved lower surface matching the curvature of the lower surface of the rocker piece and configured to deform into a flattened condition during static loads associated with walking.

As an example, the plantar surface of the shoe has a flat surface portion extending along at least part of the length of the sole from the heel towards the toe of the shoe upper, and the rocker piece has a flat upper surface secured to the flat surface portion of the sole. In a particular example, the lower surface of the rocker piece has a forward portion which extends upwards and meets the flat upper surface at a break point spaced from the toe of the sole, and the intermediate layer has an upper portion secured to the sole of the shoe in front of the break point. In a particular example, the lower tread layer is secured over the lower surface of the intermediate layer and any exposed portion of the sole of the shoe in front of the flat upper tip portion. As an example, the lower surface of the rocker piece and upper surface of the intermediate layer are of matching curved shape. In an example, the rocker piece has a flat lower surface portion extending from the heel of the shoe and an upwardly tapered portion extending from the flat lower surface portion to the break point, and the upper surface of the intermediate portion has a shape matching the flat surface portion and upwardly tapered portion of the rocker piece. In another example, the flat surface portion extents up to a position on the sole substantially corresponding to the location of a wearer's metatarso-phalangeal joint.

In an example, the intermediate layer comprises one or more shear-thinning elements attached to the lower surface of the rocker piece and part of the sole of the shoe between the rocker piece and toe of the shoe.

Other features and advantages will become more readily apparent to those of ordinary skill in the art after reviewing the following detailed description and the accompanying drawings.

DETAILED DESCRIPTION

The subject matter described herein is taught by way of example implementations. Various details have been omitted for the sake of clarity and to avoid obscuring the subject matter. The examples shown and described below are directed to new rocker shoe designs and to a rocker shoe development kit designed to produce rocker shoes of any design in a more consistent fashion.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Although some of the embodiments described below are concerned with kits for construction of rocker shoes for medical applications, and with rocker shoes which may be produced with the kits or by other means, it will be understood that a similar kit may be designed for manufacturing other types of footwear intended for non-custom medical and consumer markets.

Figure 1:
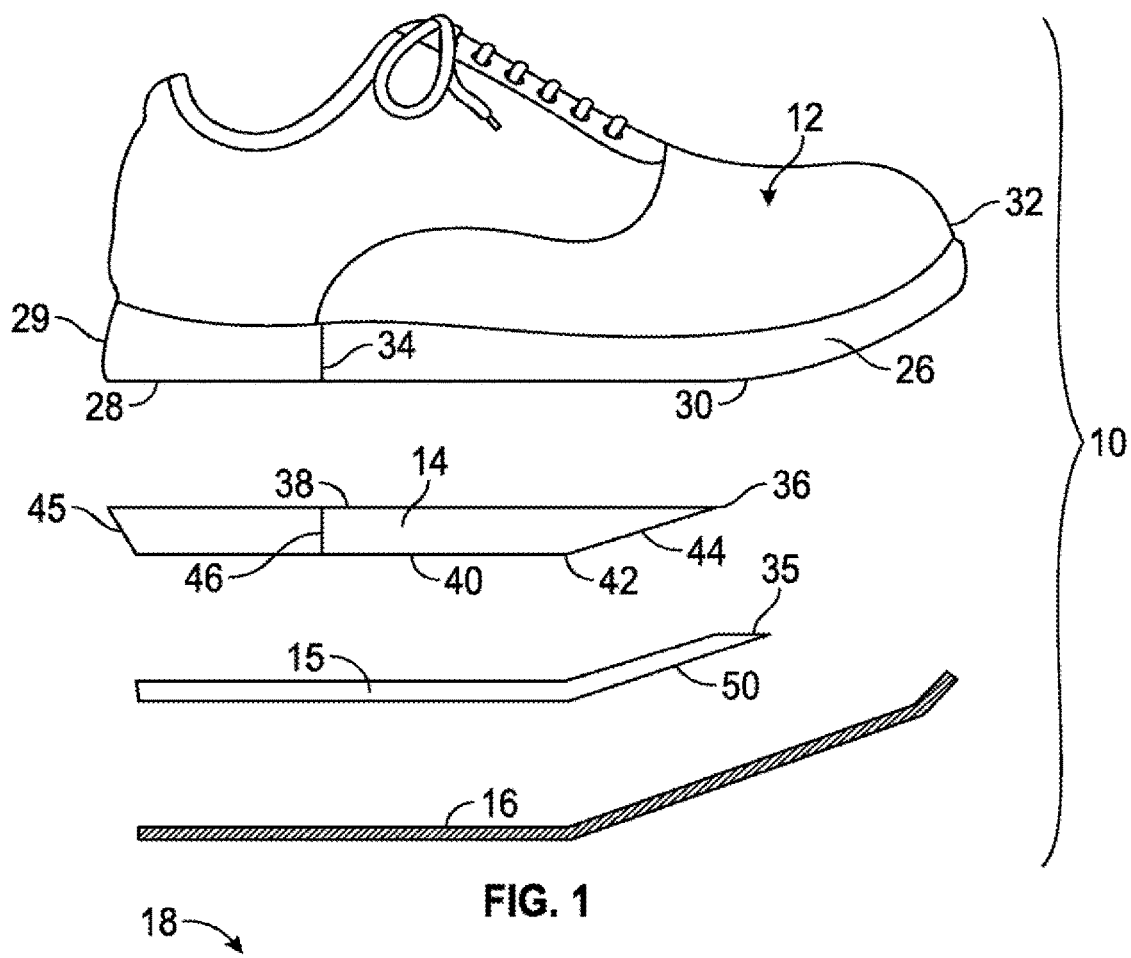
FIG. 1 is an exploded side elevation view illustrating parts of one embodiment of a rocker shoe development kit.
Figure 3:
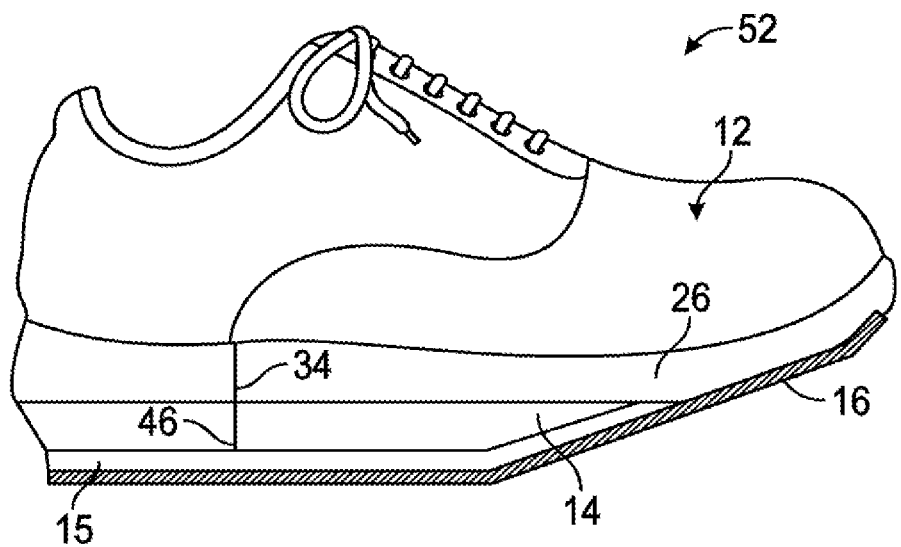
FIG. 3 is a side elevation view of a rocker shoe produced with the kit of FIGS. 1 and 2.

FIG. 1 illustrates one embodiment of a rocker shoe development kit or assembly 10 which comprises a prepared shoe upper 12, a rocker piece or rocker member 14, a cushioning layer 15, and a tread layer 16. Although only one rocker shoe assembly is illustrated, the kit includes a pair of shoe uppers and corresponding rocker members, cushioning layers, and tread layers for a pair of right and left rocker shoes. Although this embodiment includes a pre-prepared shoe upper 12, in an alternative embodiment the kit may comprise only the rocker members 14, cushioning layers 15, and tread layers 16 for a pair of shoes, and the shoe uppers may be prepared as needed from shoes which are cut to form a flat surface portion on the sole for attachment of the shoe kit parts. FIG. 1 illustrates one example of a kit for producing a predetermined rocker profile as illustrated in FIG. 3 when assembled, but it will be understood that the same basic kit may be provided with rocker pieces of different shapes to produce different rocker profiles, and an example of an alternative rocker profile kit is provided in FIGS. 4 and 5, as described in more detail below. Rocker kits of various different profiles may be provided for different prescribed ankle angular motion, so that the medical professional can choose the kit which has the appropriate rocker profile for a specific patient. Embodiments of this invention include kits in a range of different rocker shoe profiles so that an appropriate kit can be selected for a patient based on height and the desired rocker motion.

Figure 2A:
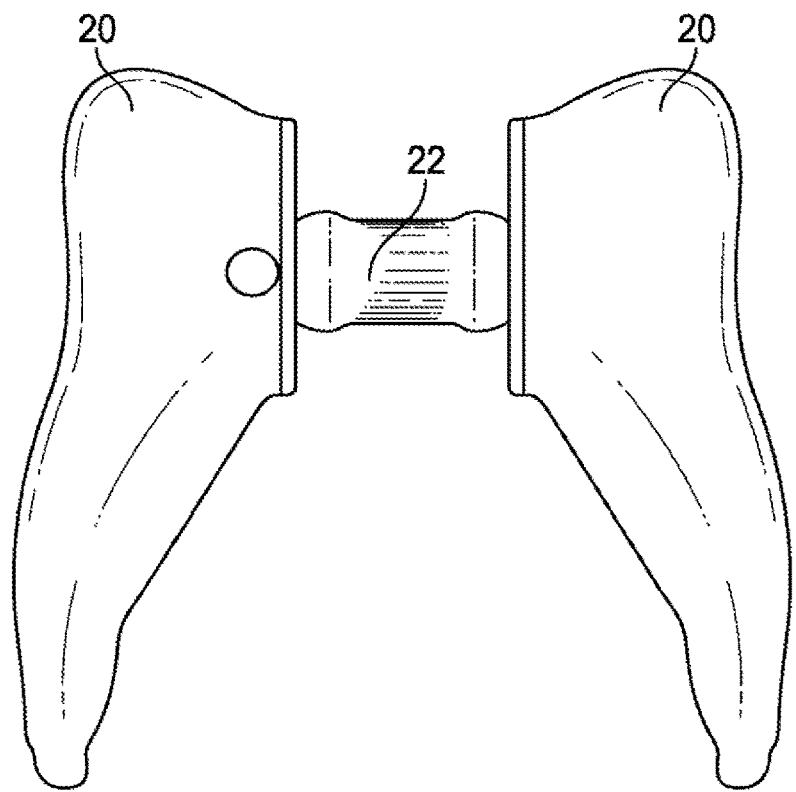
FIG. 2A is a side elevation view of a dual shoe last jig for use in preparing the shoe upper part of the rocker shoe development kit of FIG. 1.
Figure 2B:
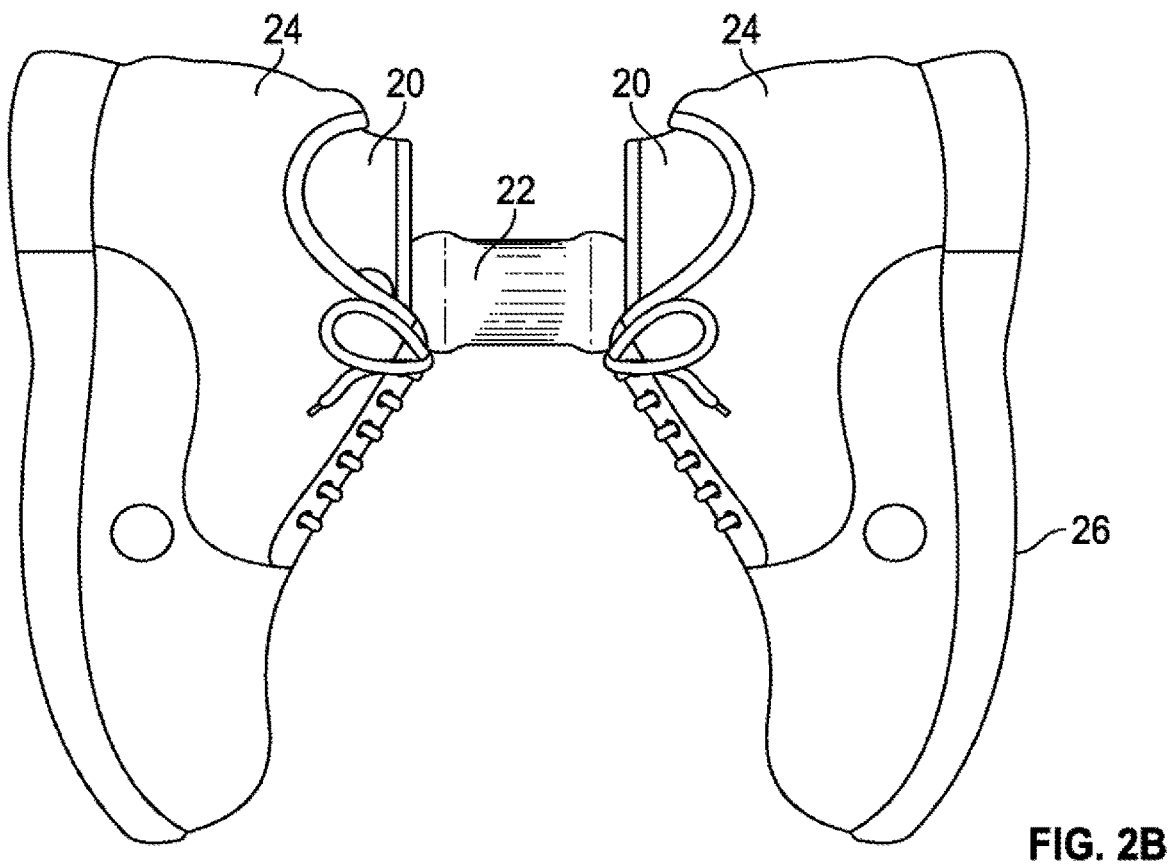
FIG. 2B is a side elevation view of the dual last jig of FIG. 2A with a pair of shoes located on the two shoe lasts or prosthetic feet prior to preparation.
Figure 2C:
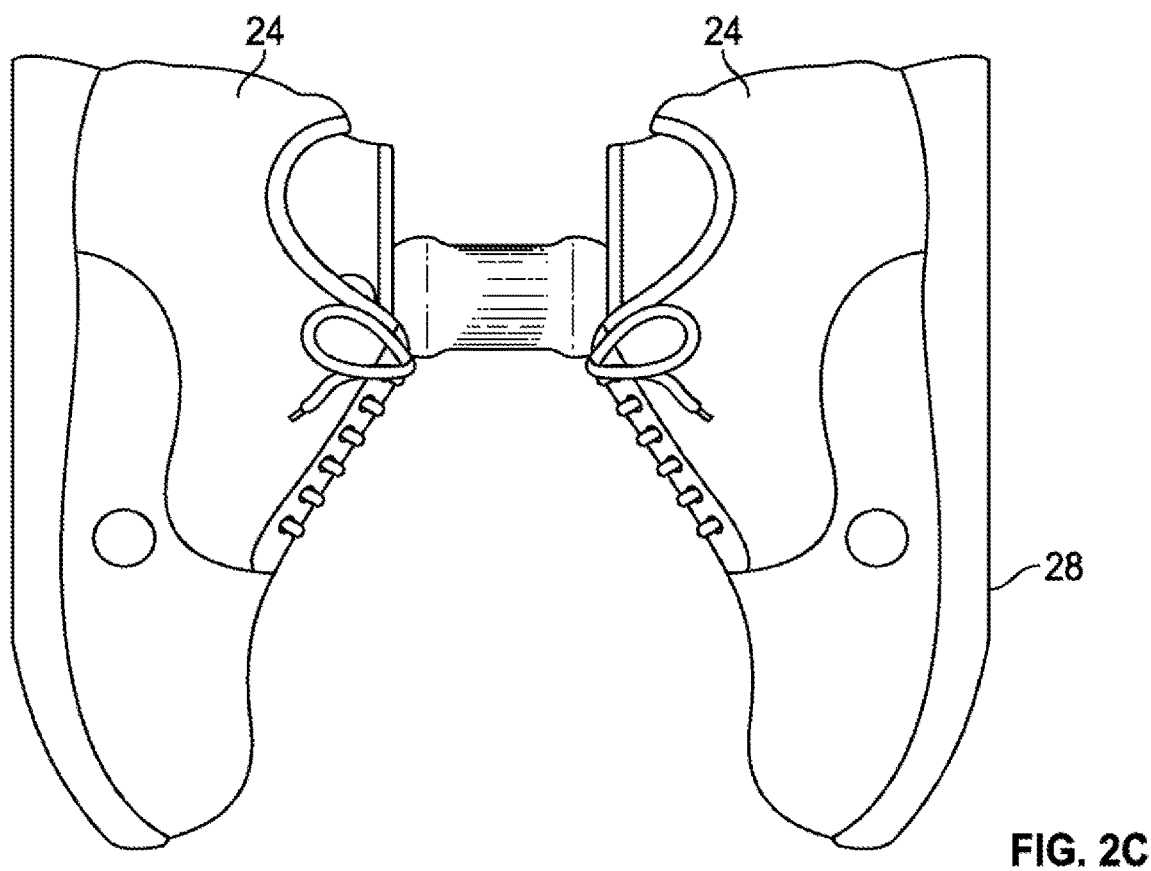
FIG. 2C is a side elevation view similar to FIG. 2B showing the shoes after the soles have been partially cut off to leave a flat base for connection of rocker pieces to the flat base.

In one embodiment, where the kit does not already include a prepared shoe upper or left and right shoe uppers, it may also include a dual last jig 18 as illustrated in FIG. 2A. In FIG. 2A, the jig 18 comprises two foot-shaped forms 20 connected together by connecting rod 22, with the soles of the foot forms extending parallel to one another. Alternatively, foot forms 20 may be replaced by adjustable size shoe lasts so that different size shoes may be pre-cut on the jig. The jig allows a pair of shoes to be secured so that the bottom soles of the two shoes are perpendicular with the table top of a band saw and parallel with the band saw blade. A pair of shoes 24 are secured on the respective prosthetic feet or lasts 20 as illustrated in FIG. 2B. The sole 26 of each shoe is then cut with the band saw to form a flat surface portion or base 28 (see FIG. 2C) for connection of the structural rocker pieces 14 to the respective soles.

As illustrated in FIG. 1, in one embodiment each prepared shoe upper 12 has a sole 26 with a flat surface portion 28 extending from the heel 29 along at least part of the length of the shoe up to a predetermined position 30 short of the toe end 32 of the shoe. In one embodiment, flat surface portion 28 extends up to 75% or 80% of the length of the shoe and position 30 may be at a location which at least substantially corresponds to the first metatarsal phalangeal joint of the toes of a wearer of the shoe. A marker or indicator line 34 is provided on one or both of the opposite side faces of the sole at a position aligned with the ankle region of the shoe, i.e. the region where the ankle joint is expected to be located for persons with normal anatomy.

In some embodiments, rocker piece or member 14 is made of a rigid or semi-rigid non-deforming material such as plastic, hard foam, hard crepe, or the like. The material is selected to be relatively lightweight to keep the shoes light in weight. In one embodiment, the rocker piece was made from Ultem® plastic material, but other materials with similar properties may be used in alternative embodiments. The rocker piece has a profile or outer periphery designed to follow the profile of the planter surface of the shoe sole up to break point 36 at the tip of the rocker piece. Upper surface 38 is flat, and the lower surface 40 in this embodiment is also flat up to point 42, after which an upward taper 44 extends from point 42 to break point 36. The rear end 45 of rocker piece 14 has a slight inward taper. In some embodiments, a marker or indicator line 46 is provided on one or both of the opposite side faces 48 of the rocker piece for proper alignment of the rocker surface with the ankle region of the shoe, i.e. at the location on the rocker piece which is intended for alignment with the region where the ankle joint is expected to be located for persons with normal anatomy when the shoe is worn. In some embodiments, the rocker piece has transverse plane dimensions which exactly match those of the flat-bottomed shoe upper up to a position close to or at break point or the forward end 30 of the flat lower surface of the sole, and covers the portion of the plantar surface of the sole from the heel up to break point 36, which is positioned slightly rear of forward end 30 of the flat sole portion in the embodiment of FIGS. 1 and 3. In other embodiments, the rocker piece may cover more of the plantar surface, up to the entire plantar surface of the sole of the shoe.

In one embodiment of a method of constructing rocker shoes for medical applications, the line 46 on the rocker piece is aligned with line 34 on the corresponding side face of the shoe sole of a prepared shoe upper 12 before securing the rocker piece 14 to the flat lower surface portion 28 of the shoe sole with glue or the like. Any part of the rocker piece which then extends beyond the heel of the shoe is ground away in the transverse plane, without any modification to the plantar features of the rocker piece. Cushioning layer 15 is then attached to the lower surface of the rocker piece, and the tread layer 16 is attached over the lower surface of the cushioning layer and exposed forward end portion of the shoe sole.

In some embodiments, cushioning layer 15 is made of a suitable cushioning material such as soft crepe or foam and is designed to cover the entire lower surface 40 of rocker piece 14. Layer 15 is of uniform thickness and has a forward end taper 50 to match the selected rocker profile. The layer 15 also matches the rocker piece and flat lower surface of the shoe in transverse plane shape, and is designed to be attached to the lower surface of rocker piece 14 by adhesive or the like. A flat upper end face 35 is adhered to the forward end of the flat sole portion of the shoe in front of break point 36 of rocker piece 14, as seen in FIG. 3. Tread layer 16 comprises a piece of rubber tread designed to be glued onto the bottom of the crepe or cushioning layer 15 and forward end portion of the sole of the shoe, up to the toe, and covers the entire lower surface of the shoe and attached rocker piece and cushioning layer. The rubber tread protects the cushioning layer from premature breakdown and is also designed to provide an appropriate level of friction between the shoe and the walking surface.

FIG. 3 illustrates the assembled rocker shoe 52. Unlike a conventional rocker shoe, the rocker piece in this shoe does not extend to the toe, but terminates at or close to the location of the first metatarsal phalangeal joint of a person wearing the shoe. This reduces the height of the rocker shoe for improved cosmetics and safety.

In some embodiments, a shoe company may provide rocker shoe assembly kits of different shoe sizes having a variety of shoe designs to accommodate the cosmetic preference of various users, including both right and left shoe uppers along with corresponding right and left rocker pieces, cushioning layers, and tread material layers. In some embodiments, flat and consistent sole portions 28 are formed on every shoe upper for simple modification by the shoe technician to add the corresponding rocker piece, cushioning layer and tread layer. Every shoe upper may be provided with indicator line 34 aligned with the expected ankle joint position for correct alignment of the shoe with the rocker piece to be attached under the sole. In this case, the dual-last jig is not necessary.

The kit of the above embodiment is designed to provide a rocker surface which terminates short of the toe end of the shoe. In other embodiments, the rigid or semi-rigid rocker pieces may cover the entire plantar surface of the shoe sole from the heel to the toe of the shoe, along with the underlying cushioning and tread layers. It will be understood that kits will be provided in a range of different shoe sizes (length and width).

Figure 4:
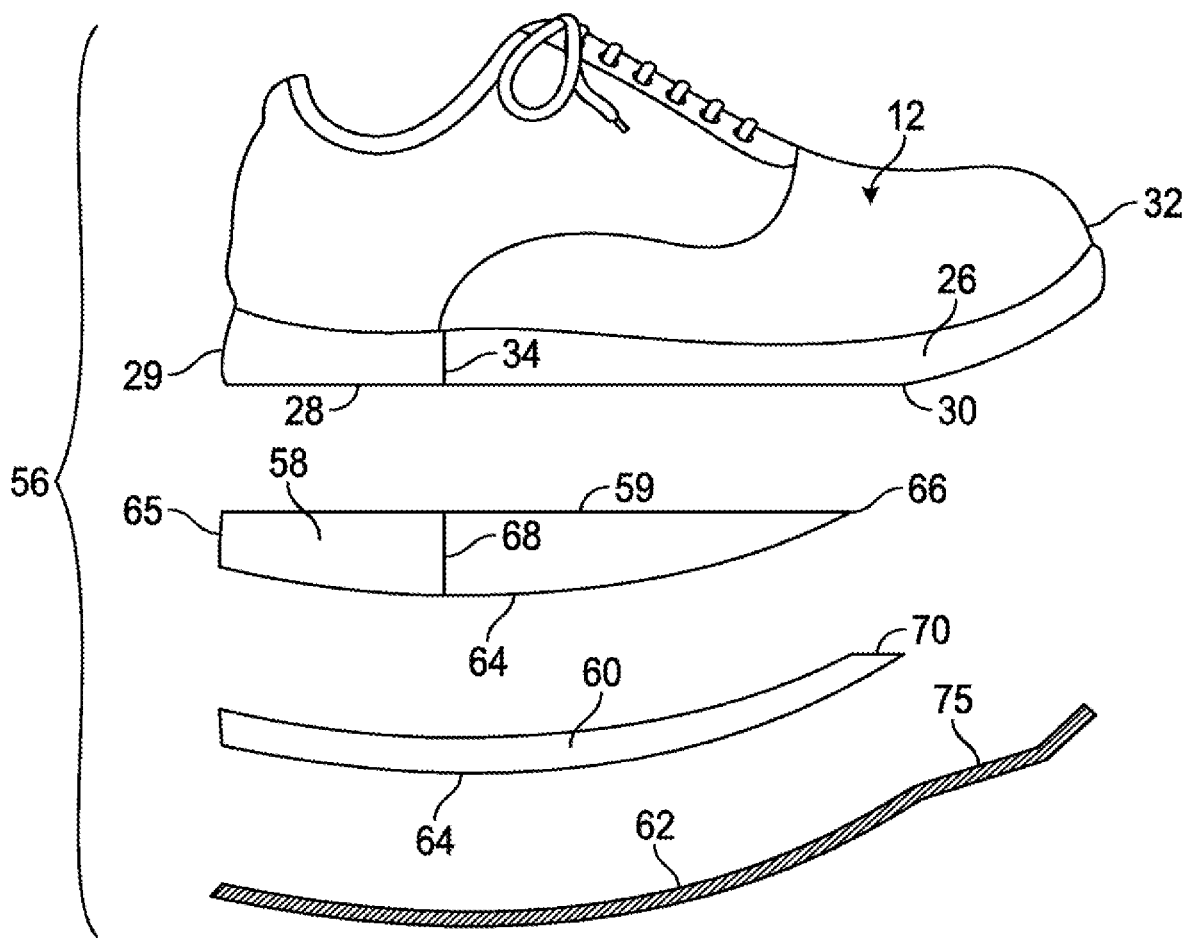
FIG. 4 is an exploded side elevation view of a rocker shoe development kit according to another embodiment, which is designed to produce a rocker shoe for better natural immobilization of the ankle during the single-limb stance or support phase of walking.
Figure 5:
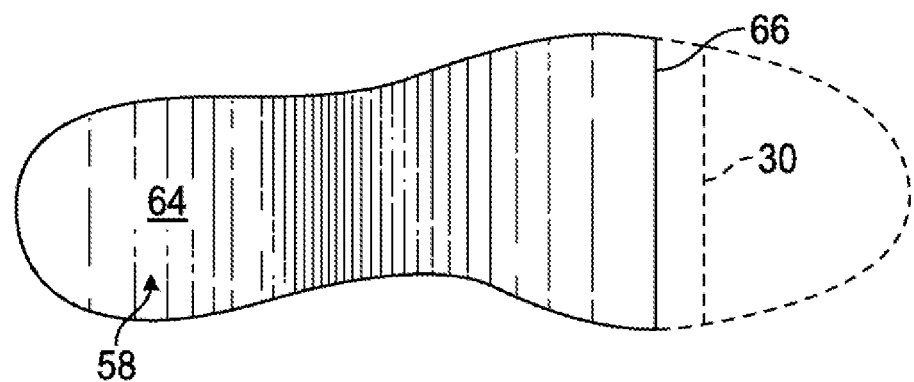
FIG. 5 is a bottom plan view of the rocker piece or member of FIG. 4.
Figure 6:
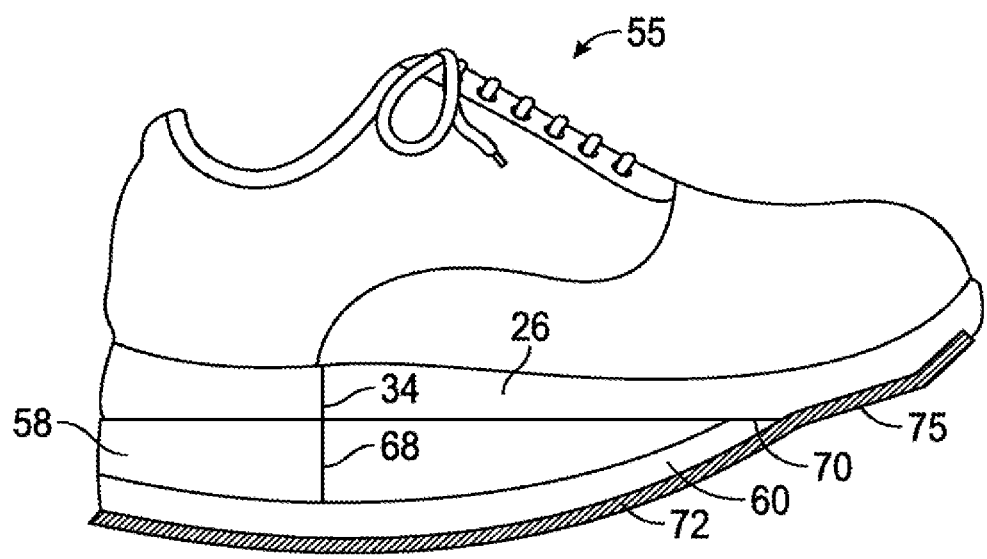
FIG. 6 is a side elevation view of one embodiment a rocker shoe for natural immobilization of the ankle constructed using the kit of FIG. 4.

FIGS. 4 to 6 illustrate another embodiment of a rocker shoe 55 (FIG. 6) and rocker shoe assembly kit 56 (FIGS. 4 and 5). The shoe upper 12 in this embodiment is the same as in the previous embodiment, and like reference numbers are used for like parts as appropriate. Kit 56 also comprises rocker piece 58, cushioning layer 60, and tread layer 62, which are of the same or similar materials to the corresponding parts of the kit of the previous embodiment, but of different shapes. The upper surface 59 of rocker piece 58 is flat. In this embodiment, rather than a lower surface which is flat and has a tapered forward end as in the previous embodiment, the rocker piece 58 has a curved, convex lower surface 64 extending from rear end 65 up to break point 66. An indicator line 68 is provided for alignment with ankle joint indicator line 34 on the shoe upper 12. As in the previous embodiment, the rocker piece covers most of the flat lower surface portion of sole 26 with break point 66 spaced from the forward end of the flat surface portion of the sole (see FIG. 5), terminating short of the toe to reduce overall height of the rocker shoe 55. In an alternative embodiment, the curved rocker piece may extend over the entire length of the shoe.

The cushioning layer 60 is of any suitable cushioning material such as crepe or plastic foam material, as in the previous embodiment, and may be formed into a curved shape matching the curvature of the lower surface 64 of rocker piece 58, with a flat, upwardly facing forward end portion 70. Forward end portion 70 is designed to be adhered to the forward end of the flat lower surface portion 28 of sole 26 in front of the forward end of rocker piece 58 when the parts are assembled as in FIG. 6. Tread layer 62 forms a lower tread surface 72 of rocker shoe 55, and is secured over the lower surface 64 of cushioning layer 60 with a forward portion 75 secured to the curved sole portion of the shoe upper between the forward end of the cushioning layer and the toe 32 of the shoe. In one embodiment, layer 60 is of deformable material which adopts the curvature of the lower surface of rocker piece 58 when adhered to that surface. The parts are glued together in turn using a suitable adhesive, as described above in connection with FIGS. 1 and 3.

Figure 7:
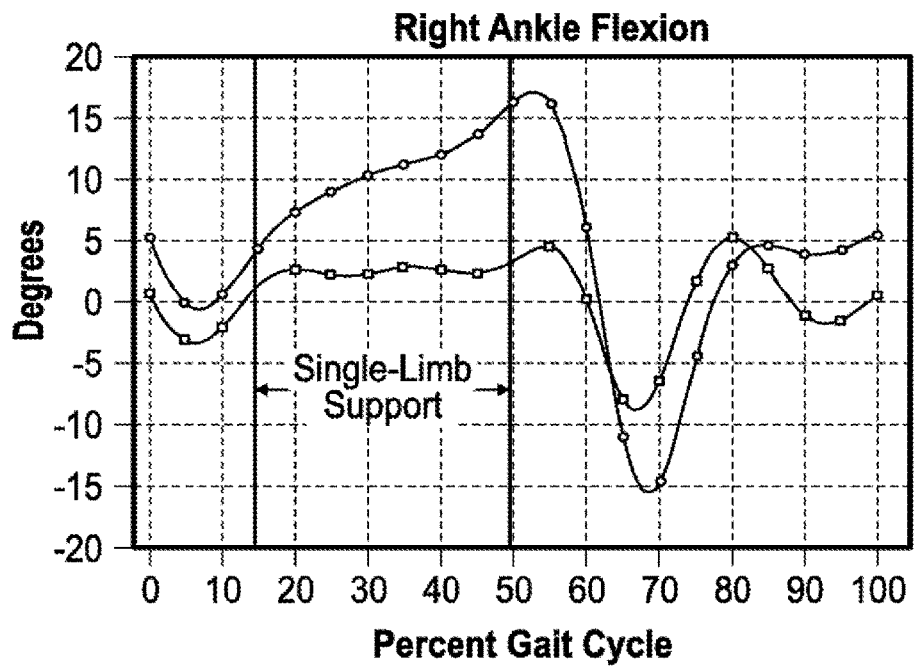
FIG. 7 illustrates graphical data from a user walking with a normal pair of shoes with a flat sole and with a pair of the rocker shoes of FIG. 6.

Rocker shoe 55 is designed to reduce ankle motion during walking, particularly during the part of a walking gait cycle when forces on the leg are highest. This is during the single-limb support portion of a walking step when the foot engages the ground at the heel and rocks onto the toes. FIG. 7 is a graphical plot which compares ankle range of motion variation over a gait cycle for a wearer when wearing a normal shoe (black circles) and when wearing the rocker shoe (black squares). The single-limb stance or support phase of the gait cycle is between the vertical lines. In some embodiments, compared to the normal shoe (upper line between vertical lines), the rocker shoe of FIG. 6 (lower line between vertical lines) reduces ankle range of motion from approximately 12 degrees to less than five degrees during the period of the gait cycle when forces on the ankle are highest. Thus, the rocker shoes of FIG. 6 reduce ankle motion or produce natural immobilization of the ankle during the stance limb support time when the forces on the leg are highest, potentially reducing ankle pain. In one embodiment, the rocker radius of the rocker shoe of FIG. 6 ranges from 10%-25% of a patient's height, with a median of around 16% of the patient's height. Kits of different rocker radius may be provided for patients of different heights or height ranges.

Figure 8:
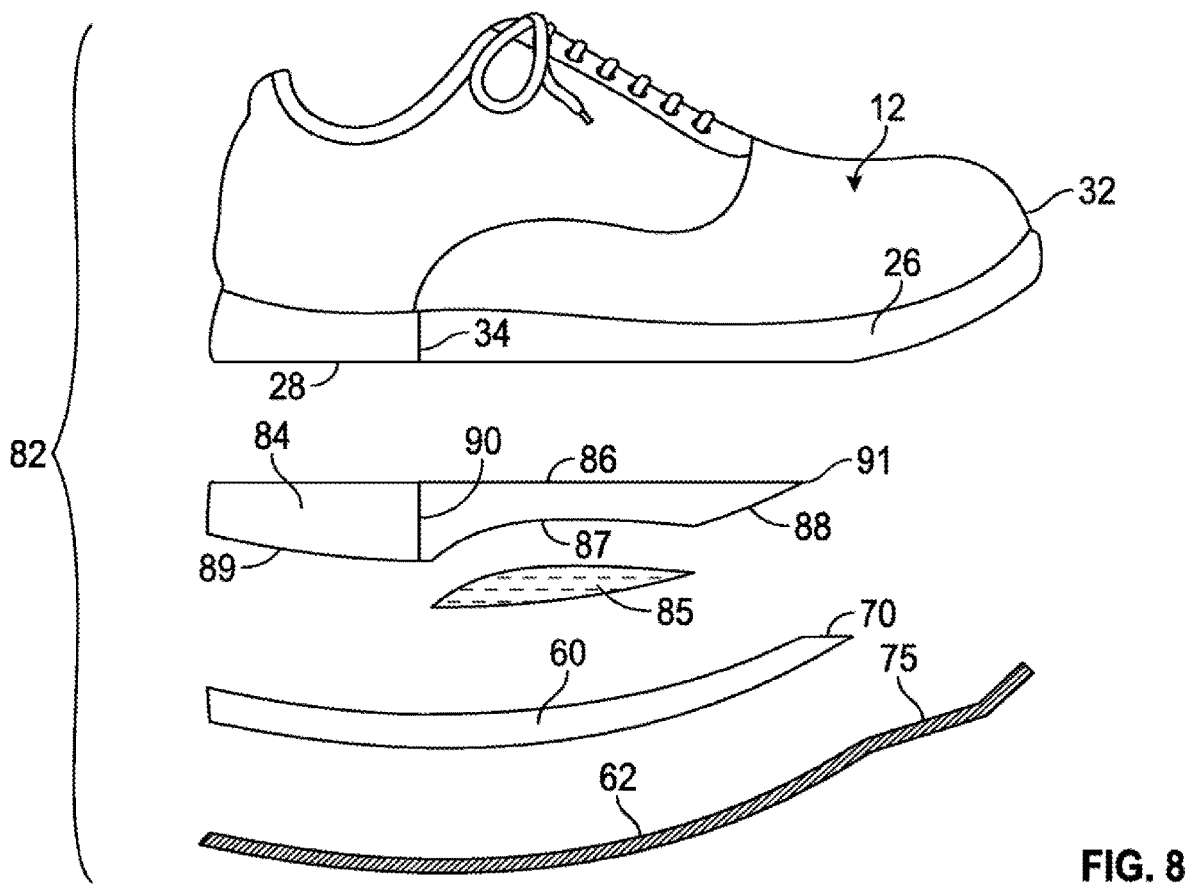
FIG. 8 is an exploded side elevation view illustrating another embodiment of a rocker shoe development kit for producing a rocker shoe for natural immobilization of the ankle with an insert having high damping or shear-thickening properties for added stability during standing.
Figure 9:
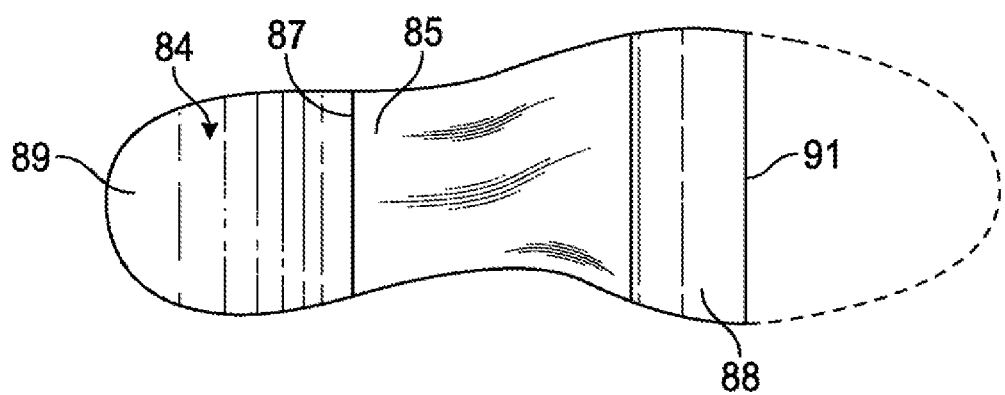
FIG. 9 is a bottom plan view of the rocker piece of FIG. 8 showing the insert positioned in the cut out extending across the width of the rocker piece.
Figure 10:
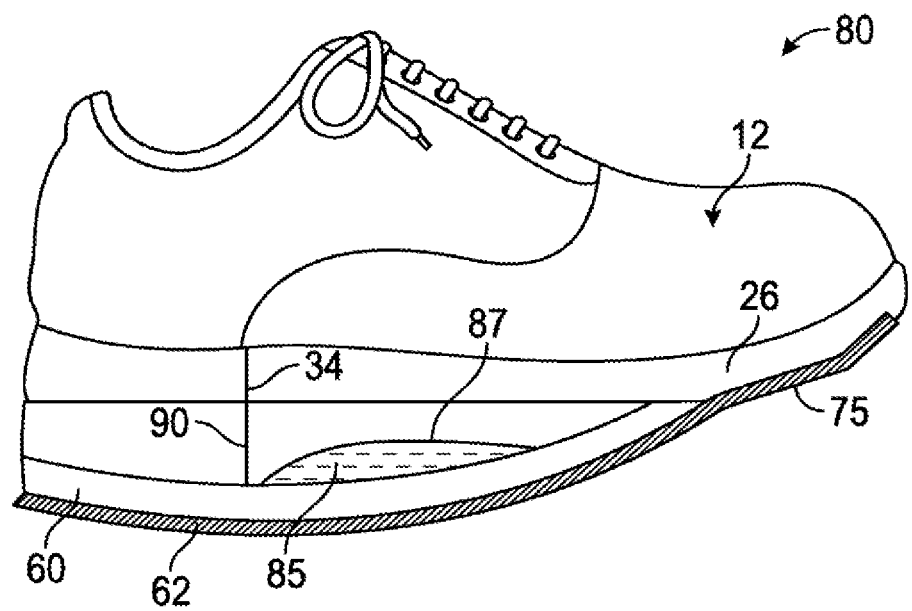
FIG. 10 is a side elevation view illustrating an embodiment of a rocker shoe constructed using the kit of FIG. 8.

FIG. 10 illustrates an embodiment of a modified rocker shoe 80 which is similar to the shoe of FIG. 6, but has an insert 85 designed to produce more stability during standing. FIGS. 8 and 9 illustrate parts of a kit 82 which may be used for making the shoe of FIG. 10. The shoe upper 12, cushioning layer 60, and tread layer 62 of the kit 82 are identical to the corresponding parts of kit 56 of FIG. 4, and like reference numbers are used for like parts as appropriate. The rocker piece 58 of the previous embodiment is replaced by modified rocker piece 84 and insert 85. Rocker piece 84 is substantially the same shape as rocker piece 58, but part of the curved lower surface of the rocker piece has a cut out or arcuate recess 87 in which insert 85 is secured.

Figure 11A:
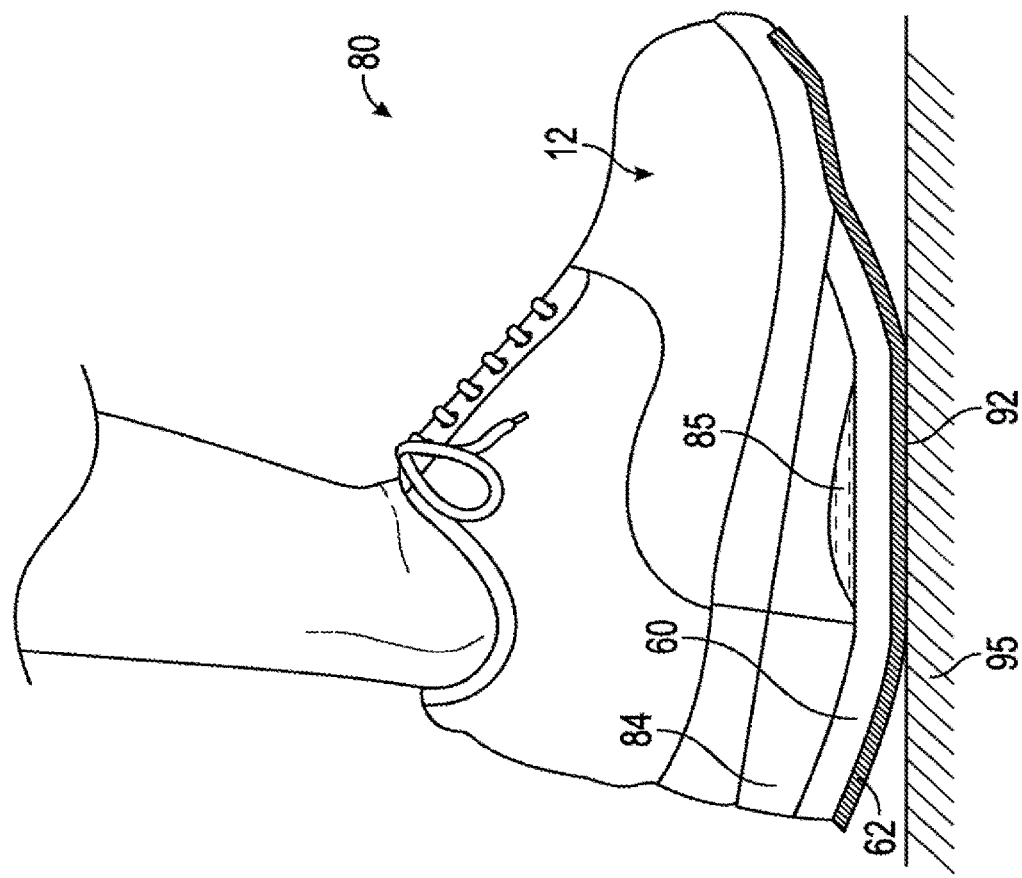
FIG. 11A is a side elevation view of the rocker shoe of FIG. 10 being worn during a dynamic phase of walking.
Figure 11B:
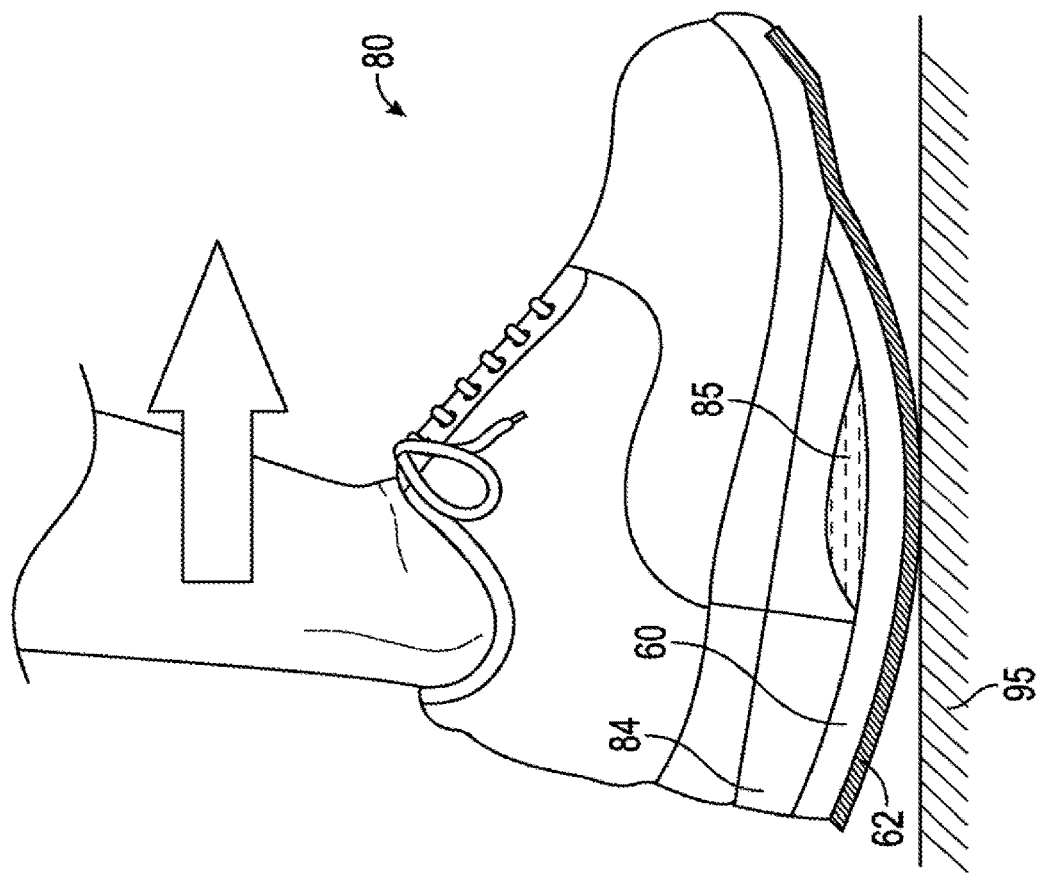
FIG. 11B is a side elevation view similar to FIG. 11A illustrating a condition of the shoe when the wearer is standing in a static position.

Insert 85 has a lower surface of matching curvature to adjacent portions of the lower surface of the rocker piece, so that the lower surface of rocker piece 84 and insert 85 form a substantially uniform curved surface similar to curved surface 64 of the previous embodiment. The insert 85 is formed from a highly damped material that does not deform significantly during the dynamic loading associated with walking, and the rocker piece and insert therefore have substantially the same effect as curved surface 64 of the previous embodiment during normal walking (FIG. 11A). During static loads associated with standing, the insert slowly deforms and adopts a flattened geometry along with underlying portions of the cushioning and tread layers 60 and 62 (see reference number 92 in FIG. 11B). This provides more stability to the wearer while standing on floor 95 as seen in FIG. 11B, since an extended area of the tread surface is flat against floor 95 as compared to the previous embodiment where the user balances on the curved surface when standing still. In one embodiment, insert 85 comprises a plastic enclosure or bag filled with a shear-thickening or dilatant material or fluid such as silly putty, cornstarch and water, or silica nano-particles dispersed in a solution of polyethylene glycol. As illustrated in FIG. 9, the recess 87 extends across the entire width of rocker piece 84 and extends over around half the length of the rocker piece, from a location spaced slightly forward from marker line 90 which is aligned with the estimated position of a shoe wearer's ankle joint. The insert is therefore positioned in the area that the shoe wearer tends to keep their center of pressure during standing balance. This helps the wearer feel more stable when standing when wearing a pair of rocker shoes with curved profile. Thus, rocker shoe 80 is designed to provide a specific curved shape for walking, but flattens for stability during standing.

Figure 12:
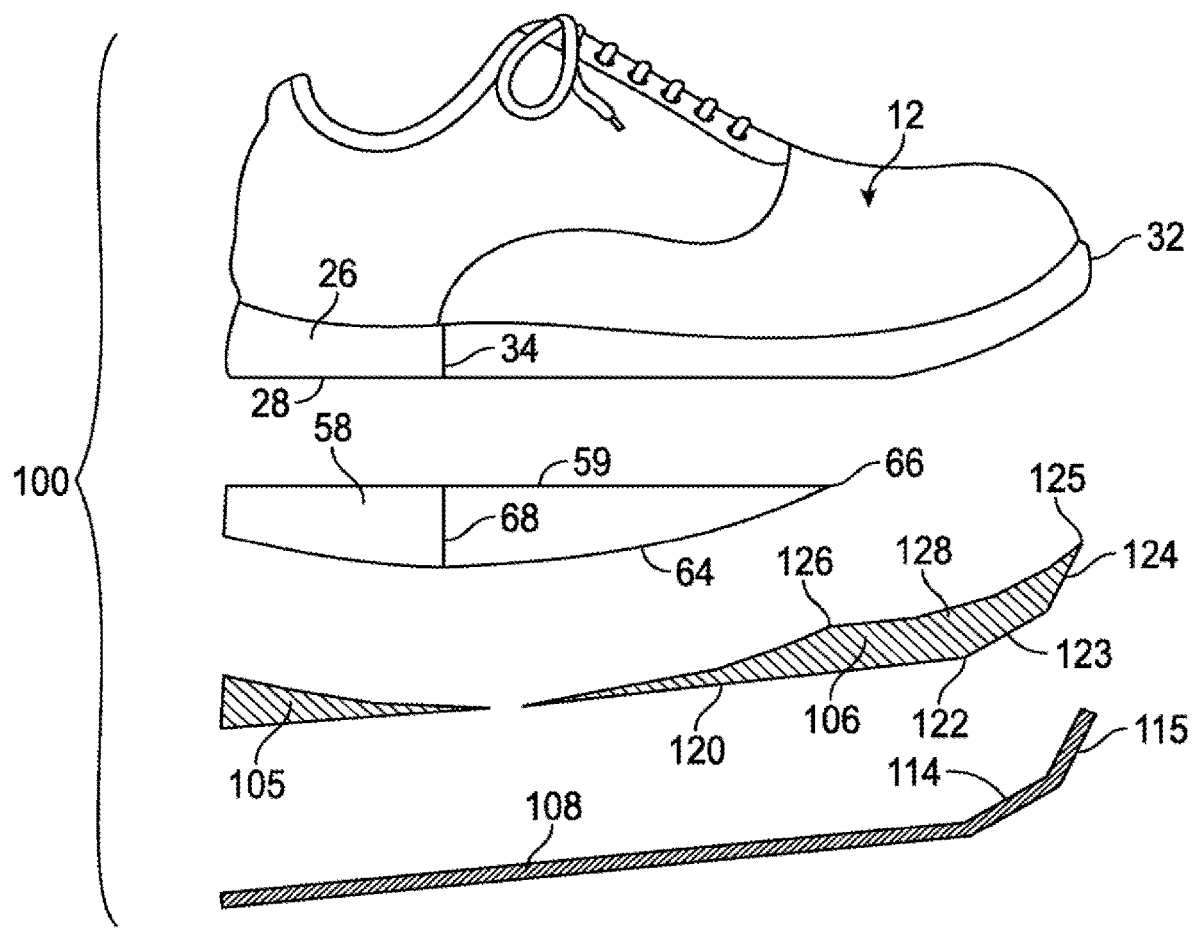
FIG. 12 is an exploded side elevation view illustrating another modified embodiment of a rocker shoe development kit with shear-thinning elements for added stability during standing.
Figure 13:
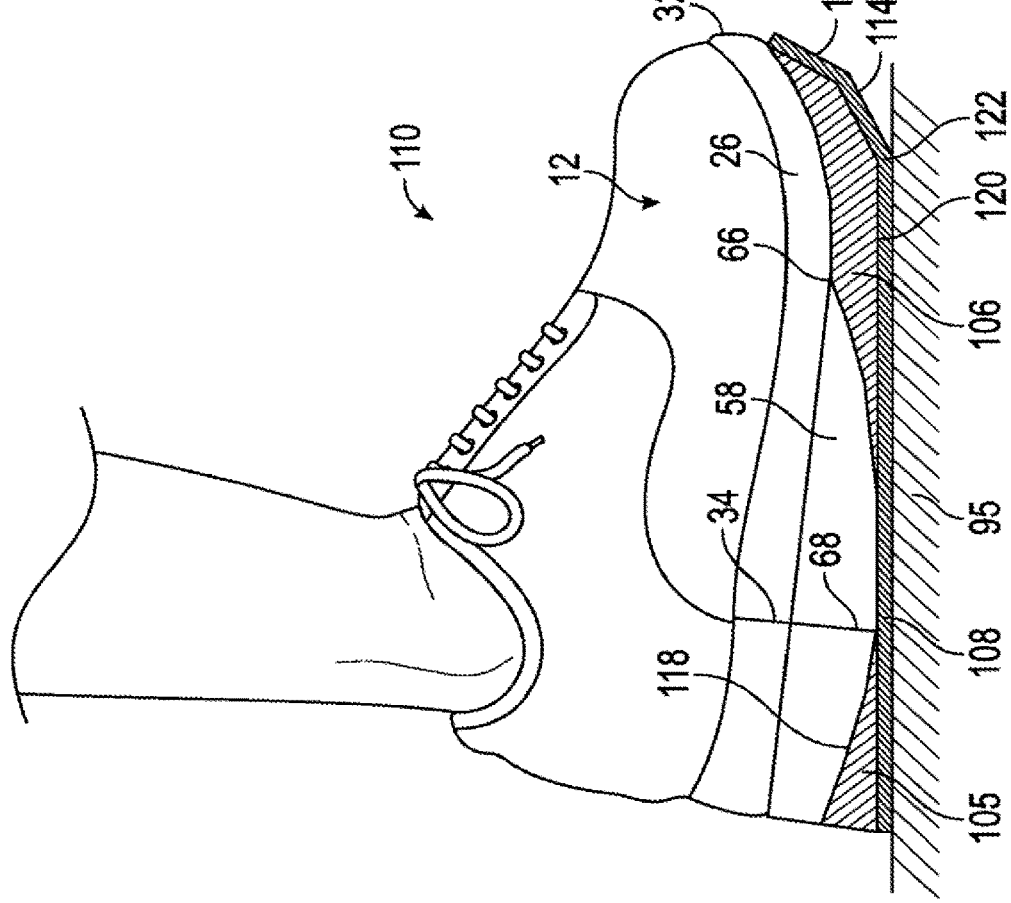
FIG. 13 is a side elevation view illustrating a rocker shoe constructed using the kit of FIG. 12, with a wearer of the shoe in a stationary, standing position.

FIG. 13 illustrates another embodiment of a rocker shoe 110 while FIG. 12 illustrates a kit of parts 100 for optional use in construction of shoe 110. Some parts of the kit in FIG. 12 are identical to those of FIG. 4, and like reference numbers are used for like parts as appropriate. Kit 100 includes shoe upper 12 with flattened sole surface 28 and a rocker piece 58 with a flat upper surface 59 for adhering to sole surface 28 and a curved lower surface 64. In this embodiment, cushioning layer 60 of the previous embodiments is replaced by a two part layer of shear thinning material. Tread layer 108 follows the shape of the bottom surface of the two part layer 105, 106 of shear thinning material, and is initially flat along most of its length from the rear end, with upwardly tapered portions 114, 115 up to the forward end.

Rear part 105 and forward part 106 of the shear thinning layer are separate inserts in this embodiment, although they may be joined together by a thin connecting portion at their inner ends in an alternative embodiment. Rear part 105 is substantially wedge shaped with a curved upper surface 118 matching the curvature of the rear end portion of rocker piece 58. Forward part 106 has a flat lower surface 120 up to point 122, followed by tapered portions 123, 124 extending up to forward tip 125. The upper surface is curved from the inner end up to point 126 to match the curvature of the rocker piece 58 up to break point 66. The remainder 128 of the upper surface is successively tapered at steeper angles up to forward tip 125, and fits against the sole 26 between the forward end 66 of rocker piece 58 and the toe 32 when the shoe is assembled as in FIG. 13. In order to assemble the shoe, the upper surface 59 of rocker piece 58 is first glued to the lower flat surface 28 of sole 26. The shear thinning parts 105 and 106 are then glued to the lower surface 64 of rocker piece 58, with the forward portion of part 106 glued to the sole in front of rocker piece 58. Tread 108 is then secured over the rocker pieces and shoe sole to complete the construction.

Figure 14:
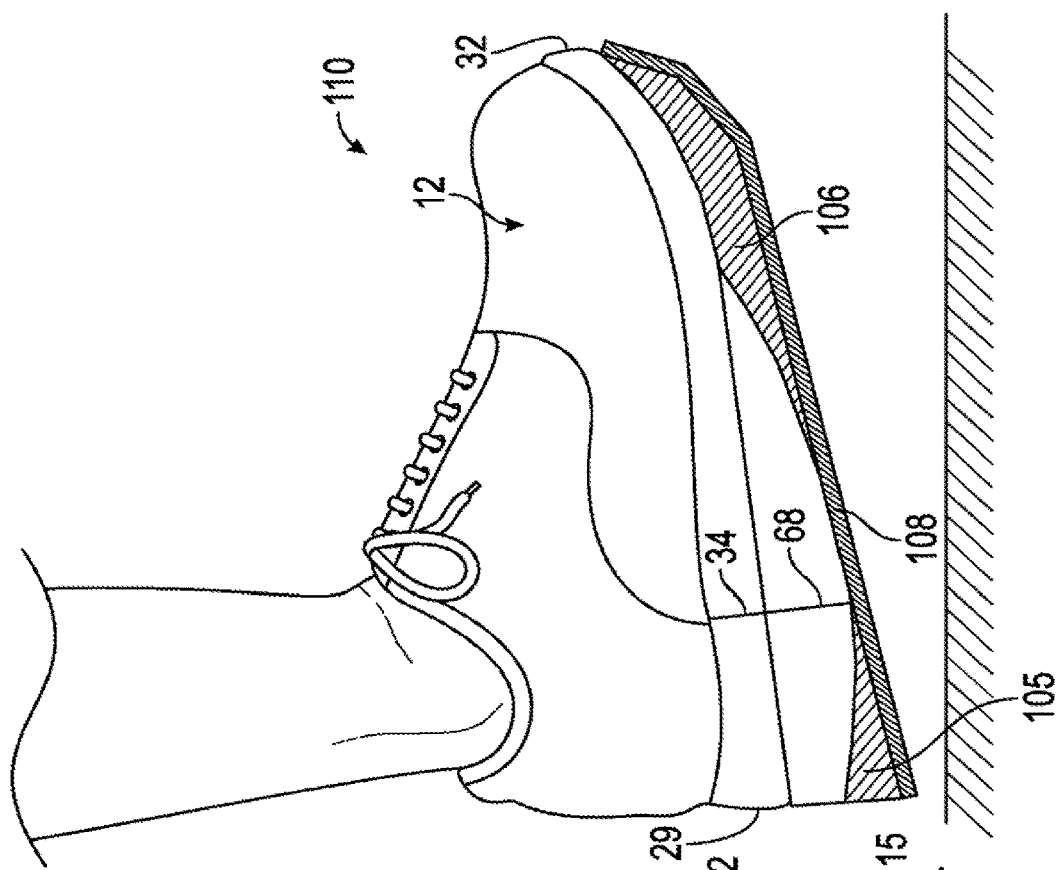
FIG. 14 is a side elevation view similar to FIG. 13 but with the wearer at the end of the swing phase of walking with the right foot.
Figure 16:
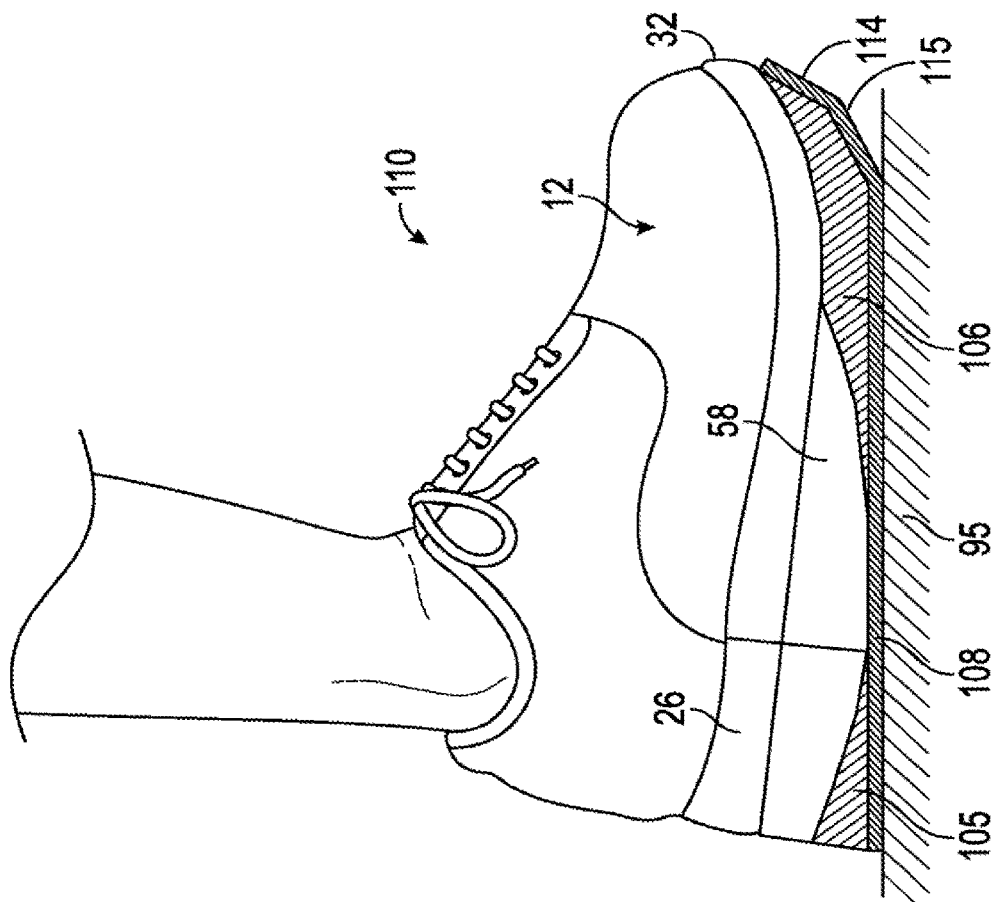
FIG. 16 is a side elevation view similar to FIG. 15 but illustrating the mid-stance phase of a walking step.
Figure 15:
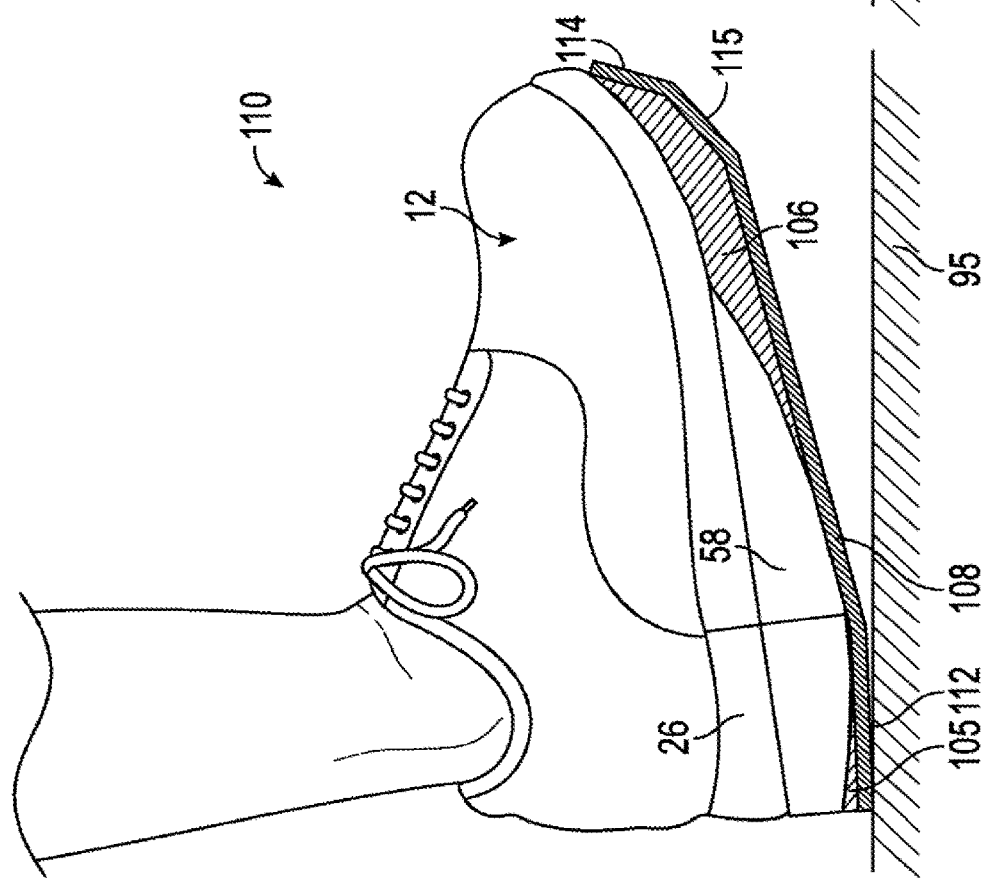
FIG. 15 is a side elevation view illustrating the shoe at the early stance phase of walking.
Figure 17:
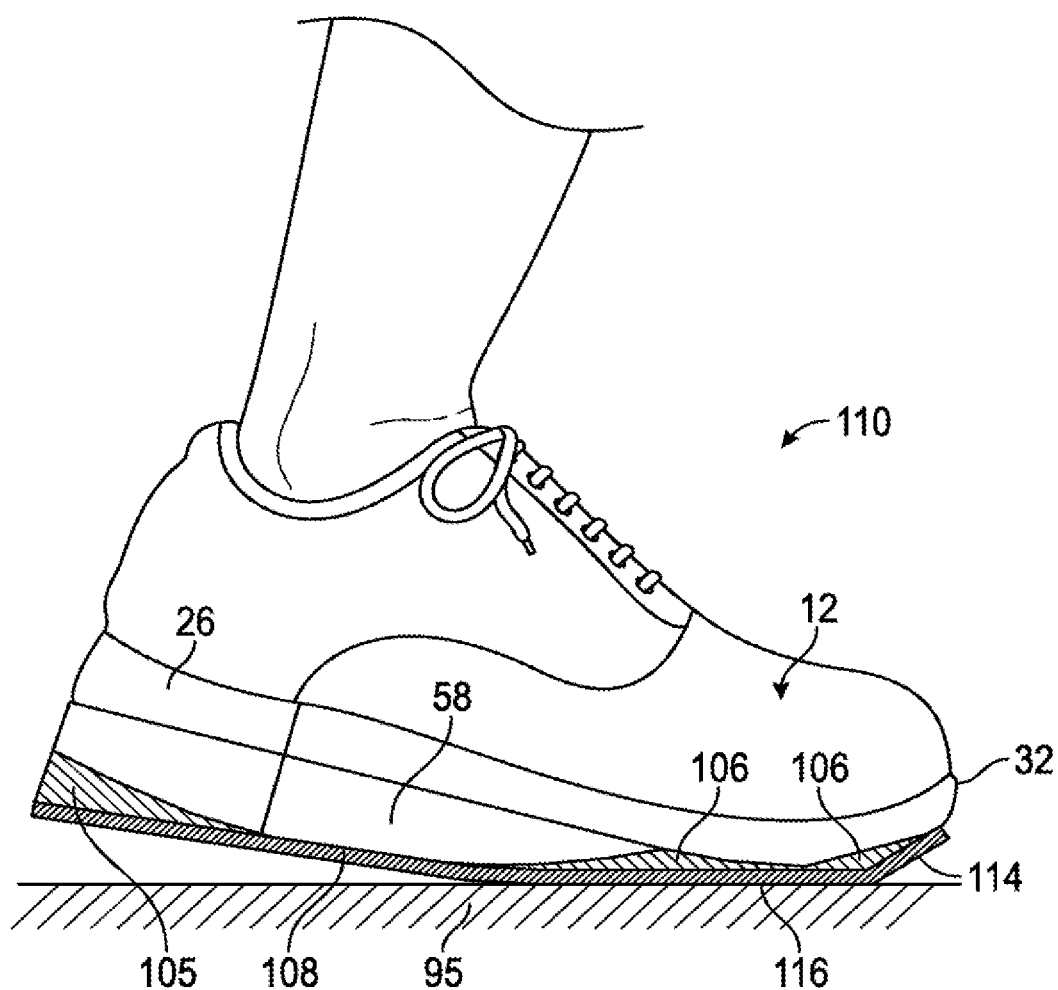
FIG. 17 is a side elevation view similar to FIGS. 15 and 16 but illustrating the late stance phase of the walking step.

As noted above, the parts 105 and 106 are of shear thinning or pseudo plastic material which has a viscosity which decreases with increasing rate of shear strain and increases under static conditions. In one embodiment, each part comprises a suitably shaped flexible walled enclosure containing a shear thinning fluid such as a polymer solution. The enclosure walls are designed to deform under pressure. As illustrated in FIG. 13, when a wearer of the shoe 110 is in a stationary standing position on surface 95 with no shear strain, the viscosity of the fluid in enclosures 105, 106 is at a maximum value and there is no compression of the enclosures, so that the bottom surface of the shoe is flat along most of its length. When the user is walking, the shoe heel touches the ground 95 as in FIG. 15 after the end of the swing phase (illustrated in FIG. 14). This causes compression of the wedge shaped rear part 105 due to thinning of the fluid in that part, so that the part and the underlying portion of the tread layer adopt a curved shape similar to the curved portion of the overlying rigid or semi-rigid rocker piece. FIG. 15 illustrates an early stance phase of the ground engaging part of a walking step. As the step continues, the user rocks forward and the shear strain applied to the part 105 is removed, so that lower surface of the shoe returns to its original conformation against the ground or floor surface 95, as illustrated in FIG. 16. This is the mid-stance phase of the walking step. The user's foot then rocks from the heel to the toe in the late stance phase of FIG. 17, so that the forward part 106 becomes compressed and conforms to the overlying part of the curved lower surface 64 of rocker piece 58 along with the underlying part of the tread layer, producing more of a rocking motion.

In some embodiments, the rocker development kits described above can be manufactured and sold in various configurations, with or without pre-formed shoe uppers, and allow rocker shoes to be produced in a more systematic and repeatable fashion. In addition, the rocker shoes of FIGS. 6, 10 and 13 lead to natural immobilization of the ankle during the single limb stance phase of walking, and are of reduced height relative to conventional rocker shoes of the same rocker radius, since the rocker pieces do not cover the entire plantar surface of the shoe. In the above embodiments, the rocker pieces have an indicator for alignment with the shoe wearer's ankle via a matching indicator on the shoe sole, for better ankle immobilization. In some of the above embodiments, the rocker pieces incorporate one or more stability inserts for better balance of the wearer when standing still.

In some embodiments, the dimensions (radius and height) of the rocker profile of the rocker kits described above are scaled to the patient's dimensions and can be expressed as a percentage of body height or foot length. In terms of body height, the rocker radius ranges from 10%-25% of a patient's height (the median radius is 16% of body height), which is approximately 66%-164% of the patient's foot length. The height of rocker profile depends on the radius selected as well as the distance between the patient's heel and metatarsophalangeal (MTP) joint. Selecting a larger radius also reduces the build height of the rocker. Rocker kits of different rocker radius may be provided for patients of different heights.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art.

What is claimed is:
1. A rocker shoe, comprising:
 a shoe upper having a heel, a toe, and a sole;
 a rocker portion with a lower rocker surface extending over at least a major portion of a lower plantar surface of the sole;
 the rocker portion comprising a rocker piece of rigid or semi-rigid material having an upper surface secured to the lower plantar surface of the sole and a lower surface, an intermediate layer secured over the lower surface of the rocker piece, and a layer of tread material secured over a lower surface of the intermediate layer and over any exposed portion of the lower plantar surface of the sole.
2. The rocker shoe of claim 1, further comprising one or more inserts of compressible material mounted in one or more cut-outs in the lower surface of the rocker piece, the intermediate layer extending over the lower surface of the rocker portion and inserts.

3. The rocker shoe of claim 1, wherein the rocker piece has a curved lower surface and the intermediate and tread layers are of softer material and conform to the curved lower surface of the rocker piece.

4. The rocker shoe of claim 3, wherein the curvature of the lower rocker surface has a rocker radius in the range from 10%-25% of a wearer's height.

5. The rocker shoe of claim 3, wherein the lower surface of the rocker piece has an arcuate indent and an insert of shear-thickening material mounted in the indent, the insert having a curved lower surface matching the curvature of the lower surface of the rocker piece and being configured to deform into a flattened condition during static loads associated with walking.

6. The rocker shoe of claim 1, wherein the lower plantar surface of the sole has a flat surface portion extending along at least part of the length of the sole from the heel towards the toe of the shoe upper, and the rocker piece has a flat upper surface secured to the flat surface portion of the sole.

7. The rocker shoe of claim 6, wherein the lower surface of the rocker piece has a forward portion which extends upwards and meets the flat upper surface at a break point spaced from the toe of the sole, and the intermediate layer has an upper portion secured to the sole of the shoe in front of the break point.

8. The rocker shoe of claim 7, wherein the lower tread layer is secured over the lower surface of the intermediate layer and any exposed portion of the sole of the shoe in front of the flat upper tip portion.

9. The rocker shoe of claim 7, wherein the lower surface of the rocker piece and upper surface of the intermediate layer are of matching curved shape.

10. The rocker shoe of claim 7, wherein the rocker piece has a flat lower surface portion extending from the heel of the shoe and an upwardly tapered portion extending from the flat lower surface portion to the break point, and the upper surface of the intermediate portion has a shape matching the flat surface portion and upwardly tapered portion of the rocker piece.

11. The rocker shoe of claim 6, wherein the flat surface portion extents up to a position on the sole substantially corresponding to the location of a wearer's metatarsophalangeal joint.

12. The rocker shoe of claim 1, wherein the intermediate layer comprises one or more shear-thinning elements attached to the lower surface of the rocker piece and part of the sole of the shoe between the rocker piece and toe of the shoe.

* * * * *